United States Patent Office

2,878,293
Patented Mar. 17, 1959

2,878,293

IODONIUM COMPOUNDS

Glenn W. Kinzer, Columbus, Ohio, assignor, by mesne assignments, to Chilean Nitrate Sales Corporation, New York, N. Y., a corporation of New York No Drawing. Application September 3, 1953
Serial No. 378,413

14 Claims. (Cl. 260—607)

This invention relates to iodonium compounds. More particularly, it relates to an improved process for the iodylation of substituted benzenes to form iodonium compounds.

Iodonium compounds are suitable for a number of uses. For example, they have proved effective as fungicides, bactericides, rodent repellents, and fish eradicants.

It has been known that iodonium compounds can be produced by the reaction of certain aromatic compounds with iodous sulfate in concentrated sulfuric acid. However, satisfactory results have been obtained only in the iodylation of tertiary alkylbenzenes, and certain halogenated benzenes. Further, the reaction must be carried out at or near 0° C., and extreme care must be exercised to prevent the reaction from becoming violent. A similar reaction with normal or secondary alkyl benzenes results only in the degradation of the hydrocarbon.

It has now been found that by the practice of this invention, various types of substituted benzenes can be iodylated, especially n- and sec-alkyl benzenes. In addition, the reaction can be carried out at temperatures as high as 50° C. The final product is relatively free of tars, thus promoting ease of purification.

Accordingly, one of the objects of this invention is to provide a method of forming iodonium compounds.

Another object is to provide a method of iodylation which is simpler than prior-art methods, and in which the reaction can be more easily controlled.

Other objects and advantageous features will be apparent from the following detailed description.

In general, the process of this invention comprises the reaction of a substituted benzene with iodous sulfate in the presence of both concentrated sulfuric acid and glacial acetic acid.

The substituted benzenes which may be iodylated by this invention include benzene and are described by the formula

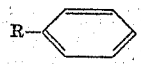

in which R is selected from the group consisting of hydrogen, a halogen, normal, secondary, and tertiary alkyl and alkenyl groupings, and cycloalkyl groupings. Suitable substituted benzenes include ethylbenzene, isopropylbenzene, n-butylbenzene, sec-butylbenzene, n-hexylbenzene, n-dodecylbenzene, and alkylbenzenes commercially produced from a Friedel-Craft condensation of chlorinated aliphatic materials with benzene. The term also includes "kerylbenzenes," which are formed by reaction of benzene with chlorinated kerosene fractions of petroleum.

The reaction products produced by this invention are formed in solution, and the iodonium ion can be represented by the radical

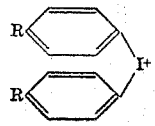

where R is defined as above. Iodonium salts may be formed by adding to the solution materials which furnish suitable anions, such as sulfates, halides, phosphates, etc.

In connection with the process of iodylating the substituted benzenes, there has been found also an improved method of preparing iodous sulfate by the reaction of iodine and potassium iodate.

Iodous sulfate can be prepared by agitating a mixture of iodine and iodine pentoxide in concentrated sulfuric acid. However, this reaction requires up to 48 hours to be completed, and an excess of ten percent over the theoretical amount of iodine pentoxide is required to completely convert all of the iodine to iodous sulfate. It has now been found that powdered potassium iodate may be used in place of iodine pentoxide. The use of this reactant requires a reaction time of only one to three hours and the excess required is only 2.5 to 5.0 percent.

The iodous sulfate prepared in concentrated sulfuric acid is cooled to a temperature of from 6° to 10° C. Glacial acetic acid is added slowly so that the temperature does not rise above 15° C. The substituted benzene is then added slowly, maintaining the temperature at from 0° to 30° C. The reaction is allowed to proceed for from one to 24 hours, maintaining the temperature from 15° to 50° C. After the reaction has been completed, the reaction product is poured onto ice and iodonium salts can be obtained from the resulting mixture by some suitable method depending upon the iodonium cation and the anion desired.

Stoichiometric amounts of iodous sulfate are used to iodylate the substituted benzene, and about 1 mole of iodous sulfate per 4 moles of substituted benzene has proved satisfactory for this purpose. The amount of concentrated sulfuric acid should not be less than about 5.6 moles. If a smaller amount is used, a viscous slurry is formed which cannot be satisfactorily treated, resulting in poorer yields of the iodonium ion. The volume ratio of glacial acetic acid to concentrated sulfuric acid should range from 10:90 to 80:20. However, especially good results have been obtained using ratios ranging from 40:60 to 60:40.

The following examples will serve to illustrate the invention with greater particularity:

Example 1

Iodous sulfate was prepared in a three-necked reaction vessel equipped with a stirring device by charging with 12.7 g. (0.05 mole) of iodine and 75 ml. of concentrated sulfuric acid. Then, 2.7 g. (0.0125 mole) of powdered potassium iodate were added slowly, the mixture being stirred rapidly. After 15 minutes, the solution of the iodine was complete, the reaction mixture being a dark brown liquid. 13.35 g. (0.0625 mole) more of powdered potassium iodate were added slowly with continued rapid stirring. The temperature was not allowed to rise above 40–45° C. during the reaction. After one hour, 1 g. more of powdered potassium iodate was added and stirring was continued for another 30 minutes, at the end of which time the conversion of the iodine to iodous sulfate was essentially complete. The final product was light yellow, powdery iodous sulfate suspended in clear, yellow-to-light amber-colored sulfuric acid.

The iodous sulfate suspension was cooled to 5° C. and 112 ml. of glacial acetic acid were added slowly, giving a sulfuric-to-acetic acid ratio of 40:60. Then, 53 g. of ethylbenzene (0.5 mole), were added slowly at 0° C. in 30 minutes. During three hours' reaction time, the temperature was permitted to rise slowly to 30° C. The reaction mixture was poured onto ice and the crude product which separated, a gummy or oil-like material which solidified on standing, was freed of unreacted hydrocarbon by trituration with petroleum ether. A yield of 76 percent bis (ethylphenyl) iodonium ion, determined as iodide, was obtained.

*Example II*

A mixture of 0.125 mole of iodous sulfate in 75 ml. of concentrated sulfuric acid and 112 ml. of glacial acetic acid (40:60 ratio) was prepared, as described in Example I. Then, 67.1 g. of n-butylbenzene (0.5 mole) were added to the mixture at 15° C. during 30 minutes. When addition of the hydrocarbon was complete, the temperature was permitted to rise slowly to 30° C. in 30 minutes. The reaction mixture was then poured onto ice and brought to a pH of 6 by the addition of concentrated ammonium hydroxide. The salt, which precipitated as a light brown gum, was dissolved in 100 ml. of methanol, acidified with hydrochloric acid, and then treated with 15 g. of ammonium chloride dissolved in 100 ml. of water. The bis (n-butylphenyl)iodonium chloride which precipitated as a gum was reprecipitated as a while powder from chloroform by the addition of petroleum ether at 0° C. The yield obtained was 42 percent.

*Example III*

The process of Example I was repeated using 82.2 g. (0.5 mole) of n-hexylbenzene. The reaction time was three hours at 25–40° C. The yield of the crude iodonium sulfate salt was 52 percent.

*Example IV*

0.125 mole of iodous sulfate in 84 ml. of concentrated sulfuric acid was diluted at 5–10° C. with 56 ml. of glacial acetic acid (60:40 ratio sulfuric to acetic acid). Then, 123 g. (0.5 mole) of n-dodecylbenzene were added to the mixture at 25–30° C. After three hours, the mixture was heated at 50° C. for an additional hour and then poured onto ice. The yield of crude iodonium sulfate salt, which separated as a brown liquid and which solidified on standing, was 58 percent.

*Example V*

The process of Example II was repeated using 60.2 g. (0.5 mole) of isopropylbenzene. The yield of crude iodonium salt, as chloride, was 62 percent.

*Example VI*

0.125 mole of iodous sulfate in 75 ml. of concentrated sulfuric acid was diluted at 5–10° C. with 112 ml. of glacial acetic acid. Then 104 g. of a sample of technical decylbenzene boiling at 132–138° C. at 3.5 mm. were added slowly at 20° C. After addition was complete, the temperature was allowed to rise to 50° C. After one hour at this temperature, the mixture was poured onto ice. The crude iodonium sulfate salt which precipitated as an oily liquid was treated in the manner described in Example I. A yield of 28 percent was obtained.

As can be seen by the foregoing description, this invention provides an improved process for the iodylation of substituted benzenes. By this process, many compounds can be easily iodylated, whereas the prior-art methods have been time consuming and difficult to control.

What is claimed is:

1. The method of iodylating substituted benzenes which comprises the steps of mixing iodous sulfate, sulfuric acid and acetic acid, and adding a substituted benzene to said mixture wherein the substituted benzene is represented by

in which R is selected from the group consisting of hydrogen, a halogen, a cycloalkyl grouping, and normal, secondary, and tertiary alkyl groupings.

2. The method according to claim 1 wherein the substituted benzene is a kerylbenzene.
3. The method according to claim 1 wherein the volume ratio of acetic acid to sulfuric acid ranges from 10:90 to 80:20.
4. The method according to claim 1 wherein the volume ratio of acetic acid to sulfurica acid ranges from 40:60 to 60:40.
5. The method of iodylating substituted benzenes wherein the substituted benzene is represented by

in which R is selected from the group consisting of hydrogen, a halogen, cycloalkyl grouping, and normal, secondary, and tertiary alkyl groupings which comprises the steps of forming a suspension of iodous sulfate in sulfuric acid, mixing acetic acid with said suspension, and adding a substituted benzene to said mixture.

6. The method of iodylating substituted benzenes wherein the substituted benzene is represented by

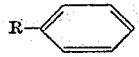

in which R is selected from the group consisting of hydrogen, a halogen, cycloalkyl grouping, and normal, secondary, and tertiary alkyl groupings which comprises the steps of mixing with agitation iodine and potassium iodate in sulfuric acid, allowing said mixture to react whereby a suspension of iodous sulfate in sulfuric acid is formed, forming a mixture of acetic acid with said suspension, and adding a substituted benzene to said mixture.

7. A composition of matter consisting of a bis(kerylbenzene)iodonium salt.

8. The method of iodylating benzene which comprises the steps of mixing iodous sulfate, sulfuric acid, and acetic acid and adding benzene to said mixture.

9. A composition of matter consisting of a bis (kerylbenzene)iodonium salt, said salt comprising an inorganic anion and a bis(kerylbenzene)iodonium cation.

10. The composition of claim 9 wherein the anion is a halide.

11. The composition of claim 9 wherein the anion is a sulfate.

12. The composition of claim 9 wherein the anion is phosphate.

13. The composition of claim 9 wherein the anion is a nitrate.

14. A composition of matter consisting of a bis (kerylbenzene)iodonium salt, said salt comprising an anion of an organic acid and a bis(kerylbenzene)iodonium cation.

References Cited in the file of this patent

UNITED STATES PATENTS

| | | |
|---|---|---|
| 755,808 | Stephenson | Mar. 29, 1904 |
| 2,562,432 | McCann | July 31, 1951 |

OTHER REFERENCES

Massen: 139 Nature, 150–151, January 23, 1937.
Fuel Oil Manual, Schmidt, Allied Oil Co. (1951), pp. 7 and 11.
Beringer et al., J. Am. Chem. Soc. 75, 2705–2708 (1953).
Hackh's Chem. Dictionary, page 468.